Nov. 14, 1967     H. PAPST     3,353,046

QUIET-RUNNING ELECTRIC MOTOR

Original Filed April 27, 1960     2 Sheets-Sheet 1

Inventor:
Hermann Papst
by: Michael S. Striker
Attorney

Nov. 14, 1967   H. PAPST   3,353,046
QUIET-RUNNING ELECTRIC MOTOR
Original Filed April 27, 1960   2 Sheets-Sheet 2
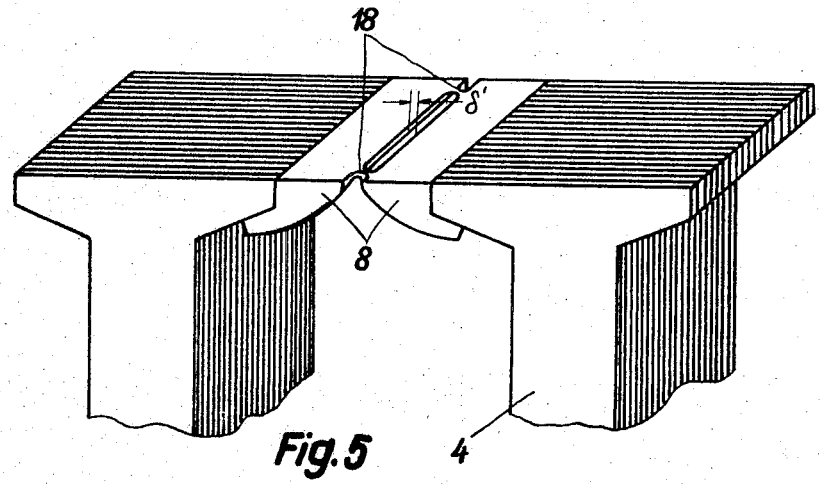
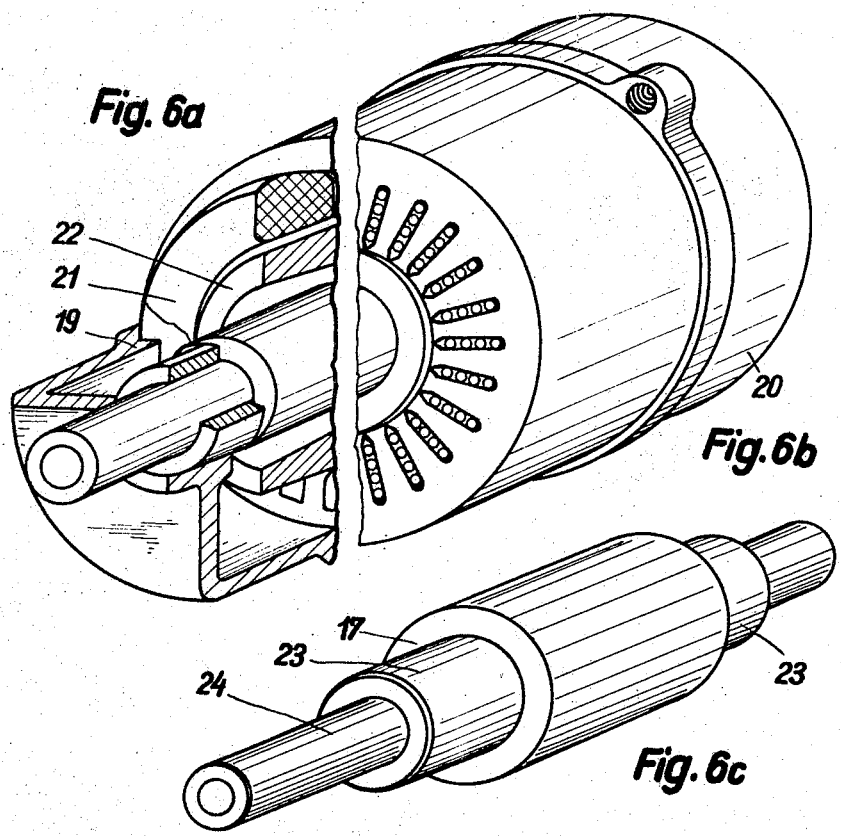
Inventor:
Hermann Papst
by:
Michael S. Striker
Attorney ved with slots. In a motor designed according to the invention the disturbing interaction of higher harmonics between the stator slots and rotor slots becomes very small. The singing noise resulting in known motors from harmonics may be brought practically to vanishing by design in accordance with the invention and motors with good electrical efficiency may be mass-produced which run at a noise level of less than 32 phons.

3,353,046
QUIET-RUNNING ELECTRIC MOTOR

Hermann Papst, St. Georgen, Black Forest, Germany
Continuation of application Ser. No. 158,674, June 16, 1966, which is a division of application Ser. No. 25,162, Apr. 27, 1960. This application June 16, 1966, Ser. No. 558,144
Claims priority, application Germany, Apr. 27, 1959, P 22,679
8 Claims. (Cl. 310—214)

ABSTRACT OF THE DISCLOSURE

In a quiet running motor having a stator member and a coaxial rotor member separated from each other by an annular air gap of uniform width, in which at least one of the members is formed with a plurality of slots forming teeth therebetween and in which the ends of the side faces of adjacent teeth at the annular air gap are spaced from each other a distance substantially equal to the radial width of the annular air gap.

---

Figure 1:
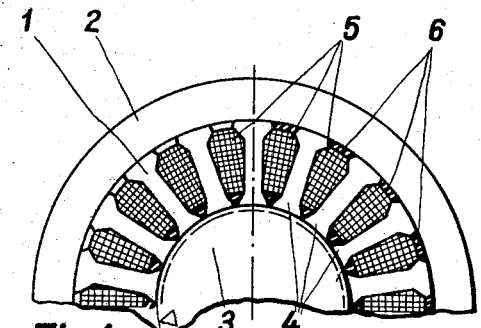

The invention relates to electric motors, especially to motors for alternating current, in which a rotating magnetic field is produced.

This application is a continuation of my application Ser. No. 158,674, filed June 16, 1966, now abandoned. Application Ser. No. 158,674 is a division of my co-pending application Ser. No. 25,162, filed Apr. 27, 1960, now abandoned entitled, "Quiet-Running Electric Motor."

Motors of this kind are used for many purposes. In many applications, especially when used as the driving motor for sound recording or reproducing apparatus, it is important that the motor shall run with the least possible noise. In addition it is in many cases important that the efficiency of the motor shall be high.

The noise resulting from the running of small alternating current motors is due mainly to the slots, in which the winding is placed which generates the rotating field. To avoid slot noise, motors have already been produced of which the stator slots are closed. However, the small bridging-pieces which cover over the slots provide an undesirable short-circuit for the magnetic lines of force of the primary field, and it has therefore been endeavoured to reduce this troublesome effect by using a very small air-gap, of about 0.1 mm.

Great difficulties arise in the manufacture of motors with such small air-gaps and even small, practically unavoidable variations in the length of the air-gap give rise to an acoustic disturbance which is quite considerable.

It is an object of the invention to overcome the aforesaid difficulties by special constructional measures.

It is a further object of the invention to provide a simple and comparatively cheap type of electric motor in which good efficiency is indicated by particularly quiet running.

It is a still further object of the invention to employ methods for a better manufacture of quietly-running electric motors.

According to one aspect of the invention, in an electric motor the distance between two neighbouring stator teeth at the surface of the stator is made practically equal to the radial length of the working air-gap, and the top portions of the sides of the teeth are inclined to the surface of the stator so that those portions of the sides of two adjacent teeth which are inclined towards each other include an angle of 90° or less. It has been found that with said relation between the separation of the teeth and the air-gap neither the intensity of the magnetic field will vary noticeably when a tooth is passing, nor the stray flux between adjacent teeth will be considerable.

With this special construction of the motor it is possible even in mass-production to build a particularly quietly-running motor. The quiet running of the motor is occasioned particularly by the magnetic field in the air-gap being very uniform and by its intensity not varying even on the rotation of a rotor which it itself pro- It is in many cases advantageous in punching the stator laminations to increase the distance between the tops of two adjacent teeth, so that the winding can be inserted through the gap between the tops of two adjacent teeth into the slot between them. In such cases the stator teeth advantageously consist of a laminated tooth body to which is added on each side a tooth cap, acting as a pole shoe, of such form that it abuts the side of the top of the tooth and that the adjacent edges of two neighbouring tooth caps have at the surface of the stator a separation which is approximately equal to the radial length of the air-gap between stator and rotor.

The additional tooth caps may advantageously consist of profiled wire which forms pole shoe bridging the individual laminations.

It has proved to be advantageous to combine the caps of two adjacent teeth into a constructional unit; this combination may be effected by cross-bridges which have only a small extent in the axial direction, amounting to not more than 10% of the axial length of the air-gap.

The invention consists in novel features and combinations hereinafter described and particularly pointed out in the appended claims.

Other aspects of the invention especially methods for the manufacture of small motors in accordance with the invention, are further described in what follows, in relation to the figures illustrating embodiments of the invention. In these drawings all elements not essential to the understanding of the invention have been omitted for the sake of clarity in illustration. In all the several figures corresponding elements are indicated by like reference numerals.

Figure 7B:
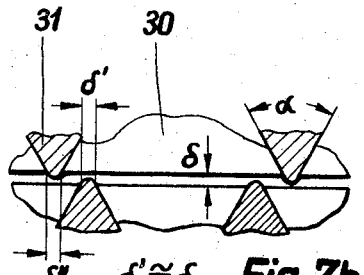
Figure 2:
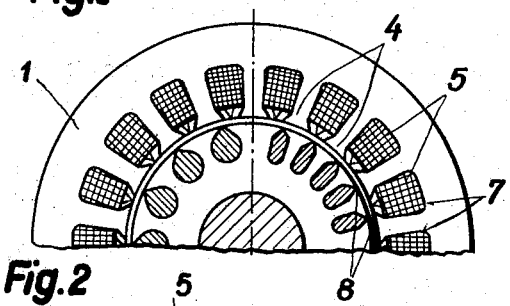
Figure 7A:
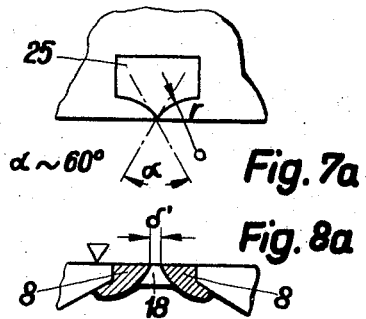
Figure 8A:
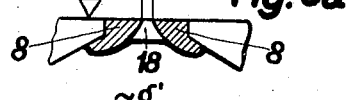
Figure 8B:
Figure 8C:
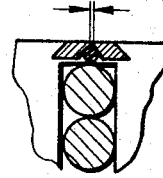
Figures 3A, 3B:
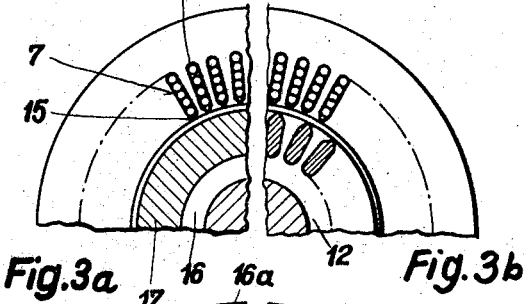
Figures 4A, 4B:
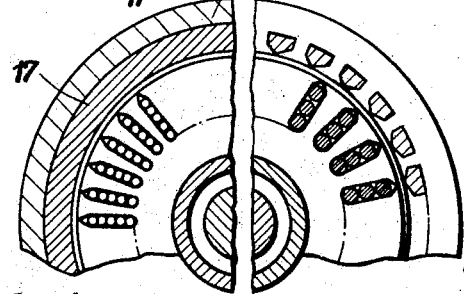
Figures 8D, 8E:
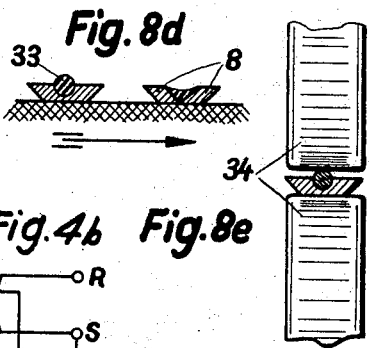
Figure 9:
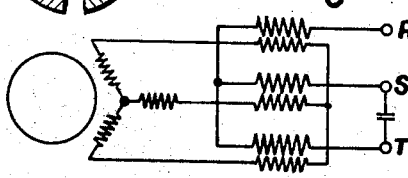

The drawings comprise FIGURES 1 to 9, of which:

FIGURE 1 shows in cross-section the upper half of a stator constructed in accordance with the invention, FIGURE 2 shows in cross-section the upper half of a stator and of a rotor according to an extension of the invention, FIGURE 3a shows in cross-section, as a further embodiment, an upper part of a stator *a* and corresponding part of a rotor, FIGURE 3b shows a cross section similar to FIGURE 3a with a modified rotor, FIGURE 4a shows a cross-section of an embodiment of the invention similar to that of FIGURE 3, but with an external rotor, FIGURE 4b shows a cross section similar to FIGURE 4a with modified rotor and stator, FIGURE 5 shows in perspective an enlarged detail of the form of the top of a tooth in a motor according to the invention, FIGURE 6a shows in a perspective view part of an induction motor with slotted rotor, as in the right-hand side of FIGURE 3, FIGURE 6b shows in a perspective view part of a hysteresis motor as in the left-hand side of FIGURE 3, FIGURE 6c shows the rotor for 6b, FIGURE 7a shows the form of a slot (e.g. as in the rotor of the right-hand side of FIGURE 3), FIGURE 7b is an illustration of the process of manufacturing the slot of FIGURE 7a, FIGURE 8a is a cross-section through the embodiment shown in FIGURE 5, with cross-bridges, FIGURE 8b is a cross-section through an embodiment with wire soldered on, FIGURE 8c is a cross-section through an embodiment with wire welded on, FIGURE 8d shows the combination of two tooth caps by the welding on of non-magnetic wire, FIGURE 8e shows the welding-on of non-magnetic wire with the help of roller electrodes, FIGURE 9 shows diagrammatically the motor connected to the mains by means of a transformer.

The part of the stator of a so-called hysteresis motor shown in cross-section in FIGURE 1 consists essentially of a core assembled from identical laminations 1 embraced by an external yoke-ring 2. The broken line 3 indicates that the assembled laminations were initially larger and extended up to the broken line, so that the teeth 4 were originally connected one with another. The winding placed in the slots is indicated at 5; the mouths of the slots are closed by wedges 6. In manufacture, these wedges are forced in under pressure, so that the laminations forming the teeth are tightly gripped in the yoke ring 2 and bear against each other like the stones of an arch.

The wedges 6 may consist, for example, of oxidised aluminum, or of a strong insulator such as Duroplast, or of ceramic. The winding is then impregnated with a thermosetting resin and cast and baked into a solid body which may be ground down. The yoke ring is then added, being readily forced on over the smooth, polished surface. A repeated impregnation combines the whole assembly into a compact body. This may be ground without the formation of deleterious grinding burrs by carrying it upon a mandrel inserted into the stamped-out tunnel. The inner reference surface is thus transferred to the outside, so that the assembly with its baked-in winding can now be put on a lathe so as to bore out or grind the inner surface and remove the connections between the individual teeth until their separation is approximately equal to the radial length of the air-gap. The separation should be smaller than or approximately equal to the air-gap provided. It is possible to determine the size of the air-gap freely, in accordance with the usual conditions. For a larger air-gap it becomes necessary to use a greater number of exciting ampere-turns; however, it is no longer essential to use an extremely small air-gap, which gives rise to exaggerated requirements in manufacturing accuracy.

In a practical example, in a motor with an external diameter of 70 mm., an axial lamination length of 30 mm., an air-gap of 0.2 mm. and a tooth width at the air-gap of about 8 mm., the induction B in the air-gap amounts to 4,500 gauss, the mean tooth induction to 12,000 gauss and the maximum induction in the yoke to 14,000 gauss.

FIGURE 2 shows an embodiment of the invention in which the winding 5 in the slots 7 of the stator can be inserted from within. In order that in accordance with the invention the separation of adjacent teeth at the inner surface of the stator shall be equal to the air-gap between rotor and stator, said members 8 are added to each side of the laminated teeth 4, which act as pole shoes to the teeth. Another arrangement is shown in FIGURE 5 and is described later with reference to that figure.

FIGURES 3a and 3b show somewhat modified embodiments. The slots 7 have V-shaped sides 15 at their ends nearer the rotor. On stamping-out the slots the sides are cut so that only a very small slit is opened between adjacent teeth. In these embodiments the windings 5 are threaded-in in known manner, and it becomes possible to provide a very large number of slots, which is very suitable as regards overload capacity and the other working characteristics of an induction or hysteresis motor. In FIGURE 3b the rotor 12 is shown as a squirrel-cage rotor, and in FIGURE 3a as a hysteresis motor. The iron core is indicated by 16, the hysteresis layer by 17, its thickness amounts to 6 mm. for a rotor diameter of 30 mm.

While FIGURES 1 to 3b show motors with internal rotors, FIGURES 4a and 4b show forms of construction with external rotors. Here, therefore, the positions of stator and rotor are reversed as compared with FIGURES 3a and 3b. In FIGURE 4a the external-rotor motor is shown as a hysteresis motor, in FIGURE 4b as a squirrel-cage motor in which the casing 16a with the hysteresis layer 17 rotates. The stator slots are relatively deep and narrow and their number is increased as compared with FIGURES 1 and 2. It is particularly advantageous for the hysteresis motor that the number of slots per pole shall be quite high, since the ladder shape of the magnetization curve for the hysteretic material signifies a sudden change in magnetization at each step of the ladder. By increasing the number of slots the change is reduced. Doubling the number of slots results in an increase in power by approximately 50%.

FIGURE 5 shows to an enlarged scale an embodiment of the additional side members 8, which have already been mentioned in the description of FIGURE 2. These side members 8, which act as magnetic pole shoes to the teeth 4, are made from a profiled iron section by stamping, pressing or rolling. The two side members for adjacent teeth, which extend towards one another are here connected together by small bridges 18. Between the bridges is a V-shaped slot with a gap of which the width $\delta'$ is equal to the radial length $\delta$ of the air-gap. Different methods for the manufacture of the non-magnetic joint of the side members 8 are described later with reference to FIGURE 8.

FIGURES 6a and 6b show perspective views of motors according to the invention. FIGURE 6a shows a squirrel-cage motor as shown in FIGURE 2, while FIGURE 6b shows a hysteresis motor as in FIGURE 3 left. The end-shield 19, together with the end-cover 20 carries the shaft. FIGURE 6a at the left shows a section through the stator winding 21 and through a rotor end-ring 22. FIGURE 6c shows the rotor of the hysteresis motor shown in 6b. The centre of the rotor consists of a complete drum 16 of hysteresis material, welded to stubs 23 of nonmagnetic material, or secured to them by an adhesive, while trunnions 24 are welded to or are a force-fit in the stubs 23.

FIGURE 7a shows an enlarged detail of a rotor slot 25 of the external-rotor motor shown in FIGURE 4. The sides of the very narrow slot which opens towards the air-gap are here formed by a slot punch which consists of one piece. Two sides are rounded to a radius $r$; these sides intersect near the surface of the rotor, that is, in the region of the air-gap, at an angle of 60°.

FIGURE 7b shows in still further enlarged detail how the slots are stamped out of the laminations 30, so that only a small distance $\delta'$ or $\delta''$ results between the edges of adjacent teeth. The foremost edge of the slot punch 31, shown shaded, thus comes in a region of the lamination 30 which is later removed in a further operation. After removing the material to form the air-gap there thus result slits or tooth separations $\delta'$ and $\delta''$ which are of approximately the same size as the radial length $\delta$ of the air-gap.

FIGURE 8a shows a wedge as in FIGURE 5, the two profiled portions which form the tooth caps 8 are brought together to form a gap $\delta'$ and are made so as to be joined in places by bridges 18. They abut closely against the sides of the tops of the teeth. It is essential that the bridges are narrow; the axial length of all the bridges being not more than 10%, in some cases not more than 5% of the axial length of the air-gap.

In FIGURE 8b the gap between the two tooth caps is filled-in by brazing in a wire 32 of non-magnetic metal.

In FIGURE 8c is shown a wedge for a narrow, half-closed slot formed similarly to FIGURE 8b; here, however, a wire is soldered or welded in place.

At the left of FIGURE 8d is shown how a wire 33 of non-magnetic metal, e.g. brazing metal, is laid between the two tooth caps, shown shaded, which are to be joined together. The tooth caps and wire are then passed through a travelling furnace. After passing through this furnace the brazing wire is melted and, as is indicated at the right-hand side of the figure, fills the gap between the two tooth caps and thus at the same time fixes their separation.

FIGURE 8a explains schematically a variation of the last-mentioned process. The tooth caps and the wire are here securely welded together by being passed between the roller electrodes 34 of a welding machine.

It has proved to be advantageous to make the tooth caps 8 of soft-magnetic material, for instance nickel iron alloy, with comparatively high electric resistance, therefore small eddy current losses.

It has been found that by using the construction according to the invention the available torque is increased and thus the power available is increased as compared with similar motors of the former construction. When running, this increase amounts to some 30% for induction motors having rotors without slots and to more than 100% for hysteresis motors. Even for stationary motors the torque is very significantly increased in like manner. It is worthy of note that this increase of power results with a reduction of current consumption.

In electrical machines with slotted stator and with slotted rotor, the fluctuation of the torque in accordance with the momentary relative positions of the teeth is substantially reduced; the actual minimum torque thus increased.

The invention may also find analagous application in small direct-current motors and generators, where importance is attached to small local variations and overall variations of the reluctance in the air-gap.

The invention is important for small motors of less than 1500 watts loading, especially for very small motors of less than 100 watts loading, which must be capable of very quite running.

In FIGURES 3 and 4 the winding of the stator is consisting of wires with large diameter so that only a small primary voltage can be used. Therefore it is necessary to contact the motor, as diagrammatically indicated in FIGURE 9, to the mains by means of a transformer, which is advantageously provided with a primary winding of isolated aluminum foil. By this the motors will become capable of a much higher load than those which are connected directly to the mains.

The additional expense caused by said transformer two or three phase) will be more than compensated by the better performance. The special shape of the slots between adjacent teeth respectively the shape of the teeth is again favourable for the better performance of low volt motors connected to mains by means of transformers.

I claim:
1. In a quiet-running electric motor, in combination, a stator member; a rotor member arranged coaxially with said stator member and separated therefrom by an annular air gap of uniform radial width, one of said members having at said annular air gap an uninterrupted cylindrical surface, the other of said members being formed with a plurality of slots so as to form teeth therebetween, each of said teeth having adjacent said annular air gap a portion wider than the remainder thereof and the side faces of said portions on adjacent teeth facing each other and approaching each other in direction toward said air gap, the ends of said side faces at said annular air gap being spaced from each other a distance substantially equal to said raidal width of said annulair air gap.

2. In a quiet-running electric motor as set forth in claim 1, wherein said side faces include at said annular air gap an angle of less than 90 degrees with each other.

3. In a quiet-running electric motor as set forth in claim 1, wherein said stator member is annular and said rotor member is located in said stator member.

4. In a quiet-running electric motor as set forth in claim 1, wherein said rotor member is annular and said stator member is located in said rotor member.

5. In a quiet-running electric motor, in combination, a stator member; a rotor member arranged coaxially with said stator member and separated therefrom by an annular air gap of uniform radial width, each of said members being formed with a plurality of slots so as to form teeth therebetween, each of said teeth having adjacent said annular air gap a portion wider than the remainder thereof and the side faces of said portions on adjacent teeth facing each other and approaching each other in direction toward said air gap, the ends of said side faces at said annular air gap being spaced from each other a distance substantially equal to said radial width of said annular air gap.

6. In a quiet-running electrical motor as set forth in claim 5, wherein said side faces include at said annular air gap an angle of less than 90 degrees with each other.

7. In a quiet-running electric motor as set forth in claim 5, wherein said stator member is annular and said rotor member is located within said stator member.

8. In a quiet-running electric motor as set forth in claim 5, wherein said rotor member is annular and said stator member is located within said rotor member.

References Cited

UNITED STATES PATENTS

| | | | |
|---|---|---|---|
| 1,302,040 | 4/1919 | Hellmund | 310—51 X |
| 1,488,876 | 4/1924 | Hambright | 310—180 |
| 2,451,633 | 10/1948 | Perrigo | 310—214 |
| 2,461,296 | 2/1949 | Ordas | 310—259 |
| 2,483,066 | 9/1949 | Sigmund et al. | 310—215 |
| 2,648,788 | 8/1953 | Fleischer | 310—51 |
| 2,956,186 | 10/1960 | Wall | 310—51 X |

MILTON O. HIRSHFIELD, *Primary Examiner.*

J. J. SWARTZ, J. W. GIBBS, *Assistant Examiners.*